Dec. 6, 1966 R. J. BARTRAM ET AL 3,290,625

YIG FILTER

Filed Feb. 27, 1964

United States Patent Office 3,290,625

Patented Dec. 6, 1966

3,290,625

YIG FILTER

Robert J. Bartram, Dallas, Richard C. Brown, Richardson, and Joe A. Simpson, Dallas, Tex., assignors to Texas Instruments Incorporated, Dallas, Tex., a corporation of Delaware Filed Feb. 27, 1964, Ser. No. 347,875
15 Claims. (Cl. 333—73)

This invention relates to a tunable filter system for high frequency electromagnetic transmission and more particularly to a system in which a pair of single crystal yttrium iron garnet elements are mounted on opposite sides of a pierced electrostatic shield and magnetically controlled for selective transmission of electromagnetic energy therebetween, thereby to form a filter the center frequency of which is selectively adjustable over a wide range in the frequency spectrum.

Ferrites such as single crystalline yttrium iron garnet (YIG) compounds have been employed in the microwave spectrum as filters. The use of such elements for microwave tuning also is known. The present invention is directed to an embodiment of the latter application in which the structure necessary for providing a multiple octave tunable band pass filter is minimized while maintaining relatively sharp selectively as to the pass band and while permitting convenient adjustment of the center frequency of the pass band over a wide range of frequencies.

In accordance with the invention, there is provided a conductive structure in which a well is formed and across which a pierced, electrostatic shield extends. An input conductor extends into the well and forms a first loop parallel to the shield with the end thereof electrically connected to a point on the structure having the same potential as the shield. An output conductor extends into the well and forms a second loop parallel to the shield with the end thereof electrically connected to the shield. A first YIG sphere is supported in the first loop and a second YIG sphere is supported in the second loop. A selectively variable unidirectional magnetic field is established in the well perpendicular to the axis of the loops to control the frequency of resonance of the spheres and thus the frequency of energy transmitted through the aperture in the shield.

For a more complete understanding of the present invention and for further objects and advantages thereof, reference may now be had to the following description taken in conjunction with the accompanying drawings in which.

Figures 1, 2, 3, 4, 5, 6, 7, 8, 9:
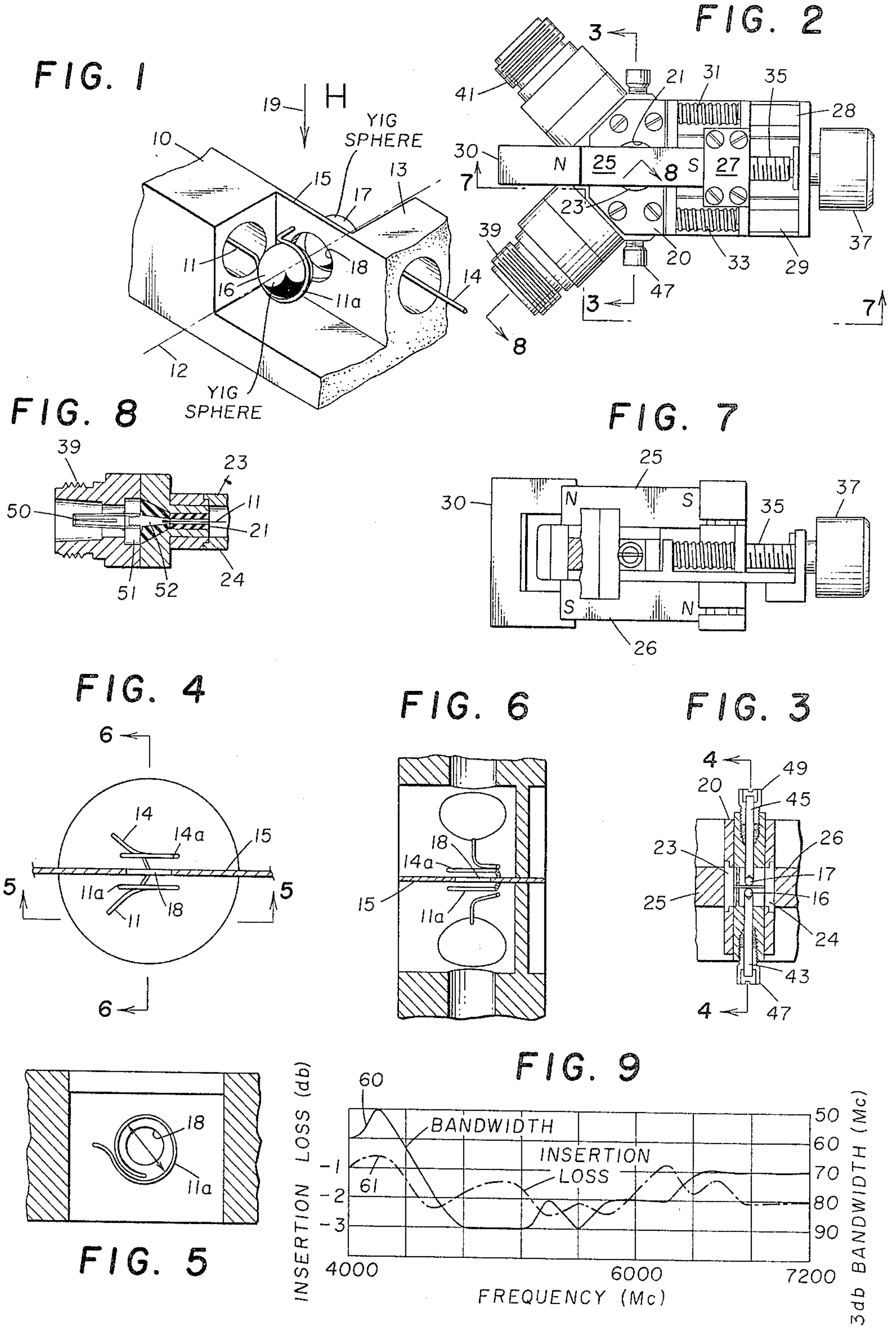
FIGURE 1 is a functional view illustrating the relationship of elements of the present system.
FIGURE 2 is a top view of one embodiment of the invention.
FIGURE 3 is a sectional view taken along lines 3—3 of FIGURE 2.
FIGURE 4 is an enlarged view of the center the system of FIGURE 3 with the YIG's removed as taken along lines 4—4 of FIGURE 3.
FIGURE 5 is a sectional view taken along the lines 5—5 of FIGURE 4.
FIGURE 6 is a sectional view taken along the lines 6—6 of FIGURE 4.
FIGURE 7 is a side view of the unit of FIGURE 2 showing a sectional view taken along line 7—7 of FIGURE 2.
FIGURE 8 is a sectional view taken along the lines 8—8 of FIGURE 2.
FIGURE 9 is a graph illustrating results achieved with one embodiment of the invention.

FIGURE 1 illustrates elements of the filter of the present invention. An input coaxial line 10 has a central conductor 11 forming a loop which lies substantially in a plane perpendicular to an axis 12. An output coaxial line 13 is provided with a central conductor 14 which similarly forms a loop lying in a plane perpendicular to the axis 12. Thus, the loops formed at the ends of conductors 11 and 14 lie in planes which are spaced apart and which are parallel to one another and are coaxial. The loops are separated by a ground plane conductor or electrostatic shield 15 to which the terminal ends of the conductors 11 and 14 are electrically connected. Spheres 16 and 17 of ytrrium-iron-garnet are positioned along the axis 12 on opposite sides of the electrostatic shield 15. The spheres 16 and 17 are encompassed by the loops at the ends of the conductors 11 and 14. A port or circular aperture 18 is formed in the electrostatic shield 15 and its center at axis 12. The port 18 is circular and of diameter generally of the order of the diameter of the spheres 16 and 17. The diameter is selected, as will hereinafter be shown, to provide a measure of control over the transmission of energy from sphere 16 to sphere 17. A unidirectional magnetic field of magnitude H as represented by the vector 19 is impressed on the spheres 16 and 17 thereby to control the frequency at which the spheres resonate for energy transfer from sphere 16 to sphere 17 through the port 18.

In accordance with the present invention, the magnitude of the field H is varied to vary the center frequency of the pass band of the filter which depends upon resonance of elements 16 and 17 into which energy is fed and from which energy is derived by way of the two coils.

The foregoing is descriptive in a general sense of the present invention. FIGURES 2–8 are more detailed illustrations of one embodiment of this invention and FIGURE 9 is a graph illustrating operation thereof.

In FIGURE 2, a body 20 has a central well 21 extending downwardly therein. A soft iron pole piece 23 is fitted in the top of well 21. A bar magnet 25 is positioned in contact with the pole piece 23. The magnet 25 is polarized at the ends as indicated, and is carried by a traveling bracket 27. The bracket 27 is mounted on guide rods 28 and 29. Compression springs 31 and 33 encircle the guide rods 28 and 29, respectively, for spring-loading the bracket 27. A lead screw 35 threadedly engages the bracket 27 and is actuated by a control knob 37 to vary the position of the bracket 27 and thus the magnet 25 with relation to the pole piece 23.

A first coaxial coupling 39 is provided for connection of a coaxial cable to the well 21 beneath the pole piece 23. A second connector 41 is similarly provided for access to the well 21.

As best seen in FIGURE 3, the magnet 25 slidably engages the upper surface of the pole piece 23. The pole piece 23 extends downwardly and is mounted in the nonmagnetic case 20.

The two YIG spheres 16 and 17 are mounted in conical ends of a pair of nonmagnetic insulating rods 43 and 45, respectively. By this means, the spheres 16 and 17 are adjustably positioned with reference to the electrostatic shield 15. The rod 43 is mounted in a hollow screw 47 which threadedly engages the case 20 to adjust the depth in which the sphere 16 is inserted relative to the electrostatic shield 15. Similarly, the rod 45 is mounted in a hollow screw 49 for positioning of the sphere 17. The spheres 16 and 17 thus are supported between the top pole piece 23 and a bottom pole piece 24.

The upper magnet 25 is magnetically coupled to a second magnet 26 which mechanically engages the bottom pole piece 24. As best seen in FIGURE 7, the magnets 25 and 26 are oppositely polarized. They are so arranged that the direction of magnetization of both magnets 25 and 26 is perpendicular to the axis of the well 21. The magnets are movable along the direction of polarization so that points on magnets 25 and 26 located at the axis of the well 21 are of opposite polarity. In order to vary the magnetic field in the air gap between the pole pieces 23 and 25, both magnets are moved along the direction of polarization to place the pole pieces 23 and 24 between points of higher or lower magnetic potential difference. By this means, linearity is obtained in the magnetic field in the air gap because the magnetic potential along the length of a permanent magnet increases linearly along the direction of magnetization. By making the pole pieces 23 and 24 very short, a low level hysteresis results with respect to the total magnetic path length and thus causes only a very small change in the demagnetization forces to which the magnets 25 and 26 would be subject as they are moved in the direction of polarization providing for excellent resettability of the system. The magnets 25 and 26 are mechanically coupled to bracket 27 and are supported at the opposite end by a C-shaped non-magnetic magnet clamp 30. As the knob 37 is rotated, the strength of the magnetic field passing through the YIG spheres may be varied. When the magnets are exactly centered over the axis of screw 47, the magnetic field through the YIG spheres is zero. Movement in either direction will produce an increase in the magnetic field effective at the locations of the spheres.

High frequency electromagnetic energy is fed to and extracted from the YIG spheres by way of the connectors 39 and 41 as above noted. The termination of the central conductors leading from the connectors 39 and 41 to the cavity inside the body 20 is illustrated in the enlarged views of FIGURES 4, 5, and 6. As best seen in FIGURE 4, the conductors 11 and 14 enter the central well 21 in the body 20 at 45° angles. They are then shaped to form single-turn loops which lie in planes parallel to the electrostatic shield 15. The loop **11*a* terminates by electrical connection to the electrostatic shield 15. Similarly, the loop 14*a* terminates by electrical connection to a similar point on the opposite side of the electrostatic shield. The conductors 11 and 14 enter the well 21 at angles, permitting the rods 43 and 45 to be inserted with their axes lying along axis 12**.

The side view of FIGURE 5 shows the single-turn loop **11*a* symmetrical with respect to the axis 12. The sectional view of FIGURE 6 provides a further illustration of the structure wherein port 18 in the electrostatic shield 15 is of diameter slightly smaller than the coils formed by the conductors 11 and 14**.

The sectional view of FIGURE 8 illustrates structure for terminating the conductor 11 in the coaxial connector 39. The central fitting 50 leading into the connector 39 is a split metal cylinder to receive a plug therein. The fitting 50 is mounted in an insulating body 51 and has a cone-shaped end 52 from which the conductor 11 extends. The dielectric material surrounding the conductor 11 terminates at the face of the well 21. The pole pieces 23 and 24 close the top and bottom of the well to form an air gap in which the spheres are to be positioned.

FIGURE 9 illustrates the performance of one embodiment of the invention in which there were employed two spheres of diameter of about 0.020 inch, made of straight yttrium-iron-garnet, having a line width of 0.5 oersted. In this embodiment, the aperture in the electrostatic shield 15 was slightly smaller than the sphere diameter and was of the order of 0.018 inch. The graph shows that over the frequency range of from 4,000 to 7,200 megacycles, the insertion loss remained substantially constant as shown by curve 61. The band width was substantially independent of the frequency as shown by curve 60. The vertical scales in FIGURE 9 are expanded and are fragmentary so that details of operation can be readily seen. By varying the position of the magnets 25 and 26, the center frequency of the pass band was shifted over about an octave, a range which is many times the width of the pass band. This was accompanied by a minimum of alteration both in the pass band and in the insertion loss.

YIG is a very dense medium which serves to attract or collect magnetic lines of force passing through the air gap. The electromagnetic energy coupled to the YIG's is changed in phase by 90°. The external magnetic field which is oriented at 90°, with respect to the axis on which the spheres are oriented, controls the frequency at which the YIG's will transfer energy. The frequency band width of transfer can be controlled from about 0.1% to 3.0% of the operating frequency by varying the spacing between the spheres, the diameter of the aperture in the electrostatic shield, and the coupling from the input conductors to the spheres. In the system whose operation is depicted in FIGURE 9, the coils were each limited to about three-quarters of a turn of No. 40 AWG copper wire, tightly banded onto the spheres in planes parallel to the plane of the electrostatic shield 15.

For operation in bands other than the 4,000 to 7,000 megacycle band illustrated in FIGURE 9, the dimensions of the spheres, the hole in the electrostatic shield and the coupling may be varied as well as the material in the spheres themselves. Gallium substituted yttrium-iron-garnet has been employed in some cases. However, it is less desirable for some applications since the line width is substantially greater than the straight YIG material above discussed. The line width is related to the sharpness of resonance of the "Q" of the material. The smaller the line width, the sharper the response.

Preferably the YIG elements are in the form of spheres. This is because the saturation magnetization of YIG changes along the 3 orthogonal crystal axes. When the material is in the form of a sphere, these changes tend to cancel each other whereas any other shape will tend to magnify the changes and cause degradation of the pass-band shape. Further, to adjust the YIG elements to optimize operation, the inner cap on the rods 43 and 45 are rotatable within the fittings 47 and 49 to allow for rotation of the YIG elements on the axis of rods 43 and 45 without moving the elements along their common axis.

Dimensions of the coaxial input lines and the like can be selected to fit a given application by those skilled in the art. Thus, in accordance with the present invention, a pair of lines are formed at the ends thereof into coils which are parallel to the plane of an electrostatic shield through which a Bethé hole is formed. The loops are positioned at the axis of the hole. YIG spheres are positioned on opposite sides of the shield and are encompassed by the respective loops for the transfer of energy from one sphere to another through the Bethé hole 18. A unidirectional magnetic field is applied perpendicular to the mutual axis of the spheres and the Bethé hole to control the frequency at which the transfer of electromagnetic energy takes place.

Having described the present invention in connection with certain specific embodiments thereof, it is to be understood that further modifications may now suggest themselves to those skilled in the art atnd it is intended to cover such modifications as fall within the scope of the appended claims.

What is claimed is:

1. In a high frequency transmission channel having input and output paths each having a central conductor, a filter which comprises:

(a) a first YIG sphere encompassed by the end portion of the first of said central conductors, (b) a second YIG of spherical shape encompassed by the end portion of the second of said central conductors wherein said YIG's are aligned on a common axis, (c) an electrostatic shield between said YIG's having a hole therethrough centeied on said axis, and (d) means for impressing a variable magnetic field which passes through the spheres at right angles to said axis to vary the center frequency of the band of electromagnetic energy to be transmitted from one of said conductors to the other through said hole.

2. The combination of claim 1 in which said spheres are of diameter slightly greater than the diameter of said hole.

3. The combination of claim 1 in which the end portions of the conductors are formed into loops of the order of one turn each oriented parallel to said shield and aligned on said axis.

4. A YIG filter which comprises (a) structure in which a well is formed and across which a pierced, electrostatic shield extends, (b) an input conductor extending into said well and forming a first loop parallel to said shield with the end of said input conductor electrically connected to a point on said structure having the same potential as said shield, (c) an output conductor extending into said well and forming a second loop parallel to said shield with the end of said output conductor electrically connected to the other side of said shield, (d) support means for positioning a first YIG sphere in said first loop and a second YIG sphere in said second loop, and (e) means for establishing a selectively variable unidirectional magnetic field extending through said well perpendicular to the axis of the loops for control of the coupling between the spheres through said shield.

5. The combination of claim 4 in which the conductors enter said well at angles to said shield and lie in a plane perpendicular to the plane of said shield.

6. The combination of claim 4 in which said support means are rotatably mounted at an axis common to said loops and the piercement in said shield.

7. A YIG filter which comprises:

(a) a nonmagnetic electrically conductive block having a well therein with an electrostatic shield having an aperture therethrough mounted to bisect said well, (b) an input conductor extending into said well and forming a first loop parallel to said shield and coaxial with said aperture with the end of said input conductor electrically connected to one side of said shield, (c) an output conductor extending into said well and forming a second loop parallel to said shield and coaxial with said aperture with the end of said output conductor electrically connected to the other end of said shield, (d) means for supporting a first YIG sphere on one side of said shield in said first loop and a second YIG sphere on the other side of said shield in said second loop with both YIG's centered at the axis of said aperture, and (e) means for establishing a selectively variable unidirectional magnetic field extending through said well perpendicular to the axis of the loops for control of the coupling between the spheres through said apertures.

8. A YIG filter which comprises:

(a) an electrostatic shield having hole therethrough, (b) a pair of coaxial transmission lines each having a loop termination for the central conductor thereof with the ends thereof connected to points of the same potential as said shield with said loops at the axis of said hole and on opposite sides of said shield, (c) two YIG elements, one mounted at said axis in each of said loops, and (d) means for impressing a selectively variable unidirectional magnetic field on said elements for control of the coupling therebetween.

9. The combination of claim 8 in which said YIG elements are mounted for movement along said axis toward and away from said hole and are rotatable on said axis at selected points therealong.

10. In a YIG filter the combination, which comprises:

(a) a nonmagnetic electrically conductive block having a cylindrical well extending therethrough with an electrostatic shield bisecting said well with a central hole therethrough for communication between the separate parts of said well, (b) soft iron pole pieces forming end closure members for said well, (c) a pair of bar magnets, one mounted for slide movement along the face of each of said pole pieces with said bar magnets being oppositely polarized, (d) a pair of coaxial lines communicating with said well and extending along a plane which includes the axis of said hole and is perpendicular to the plane of said shield, the central conductors of said lines entering said well on opposite sides of said shield and terminating in loops centered at the axis of said hole, (e) YIG elements supported in said loops adjacent to said hole for energy transmission therebetween, and (f) means for varying the position of said magnets for control of the frequency of the transmission between said elements.

11. A YIG filter which comprises:

(a) a nonmagnetic electrically conductive block having a cylindrical well extending therethrough with an electrostatic shield bisecting said well with a central hole therethrough for communication between the separate parts of said well, (b) soft iron pole pieces forming end closure members for said well, (c) a pair of bar magnets contacting opposite faces of said pole pieces with said bar magnets being oppositely polarized, (d) a bracket means for holding said magnets, (e) spring biased adjusting means for moving said magnets in direction perpendicular to the axis of said well to vary the magnetic field passing axially through said well, (f) a pair of coaxial coupling means communicating with said well with central conductors of said coupling means entering well on opposite sides of said shield and terminating in loops centered on the axis of said hole, and (g) YIG elements supported in said loops adjacent to said hole for energy transmission therebetween.

12. The combination of claim 11 wherein said YIG elements are spheres mounted for translation and rotation on the axis of said hole.

13. An article of manufacture which comprises:

(a) a conductive block having a cylindrical well therethrough with a conductive sheet bisecting said well at a plane which includes the axis of said well, said sheet having a Bethé hole therethrough whose axis is normal to the axis of said well, (b) a pair of YIG elements mounted at the axis of said Bethé hole on opposite sides of said sheet, (c) transmission means for feeding electromagnetic energy to and from said well and in part encompassing said elements, and (d) permanent magnetic means for selectively varying the magnetic field extending through said well in the direction of the axis of said well.

14. The article of claim 13 in which said YIG elements are spheres of diameter larger than the diameter of said Bethé hole.

15. An article of manufacture which comprises:

(a) a conductive block having a cylindrical well therethrough with a conductive sheet bisecting said well in a plane including the axis of said well, said sheet having a Bethé hole therethrough whose axis is normal to the axis of said well, (b) a pair of YIG elements, (c) means for mounting said YIG elements at the axis of said Bethé hole on opposite sides of said shield for movement along said axis of said Bethé hole, (d) coaxial lines for feeding electromagnetic energy to and from said well with central conductors of said lines encompassing said elements, and (e) permanent magnetic means for selectively varying the magnetic field extending axially through said well in the direction of the axis thereof.

No references cited.

HERMAN KARL SAALBACH, *Primary Examiner.*

M. NUSSBAUM, *Assistant Examiner.*